United States Patent [19]

Ohmori et al.

[11] 4,433,743
[45] Feb. 28, 1984

[54] CONTROL CIRCUIT FOR VEHICLE LEVEL ADJUSTING APPARATUS

[75] Inventors: Taiji Ohmori; Toshio Kasahara; Yoshiaki Uchida, all of Saitama, Japan

[73] Assignee: Honda Giken Kogyo Kabushiki Kaisha, Tokyo, Japan

[21] Appl. No.: 351,856

[22] Filed: Feb. 24, 1982

[30] Foreign Application Priority Data

Feb. 25, 1981 [JP] Japan .................................. 56-26558

[51] Int. Cl.³ ............................................ B60G 17/00
[52] U.S. Cl. ..................................... 180/41; 280/6 R
[58] Field of Search ................. 180/41; 280/707, 6 R, 280/6 H, 6.1, 6.11

[56] References Cited

U.S. PATENT DOCUMENTS 4,185,845  1/1980  Misch et al. ........................ 280/6 H
4,266,790  5/1981  Uemura et al. ....................... 280/6.1

*Primary Examiner*—John A. Pekar
*Attorney, Agent, or Firm*—Irving M. Weiner; Pamela S. Burt; John L. Shortley

[57] ABSTRACT

A control circuit for a vehicle level adjusting apparatus which avoids performing vehicle level adjustment in response to momentary changes in the vehicle level during driving of the vehicle, and at the same time provides a prompt vehicle level adjustment in response to essential or substantial changes in the vehicle level during a halt or rest state. The control circuit includes a first circuit which receives at least one first signal based on a comparison between a reference vehicle level range and an actual vehicle level to make a judgment as to the necessity of an adjustment of the vehicle level and issues a second signal having a first signal status when the adjustment is judged to be necessary and a second signal status when the adjustment is judged to be unnecessary. A second circuit receives the second signal and issues a third signal based in a normal state of the second circuit on the second signal status as prolonged by a predetermined time and in a reset state of the second circuit on the second signal status as not prolonged. A third circuit receives the third signal and issues a control signal to the vehicle level adjusting apparatus. The control circuit is further provided with a fourth circuit which receives a fourth signal based on a halt or rest state of the vehicle and resets the second circuit.

4 Claims, 1 Drawing Figure

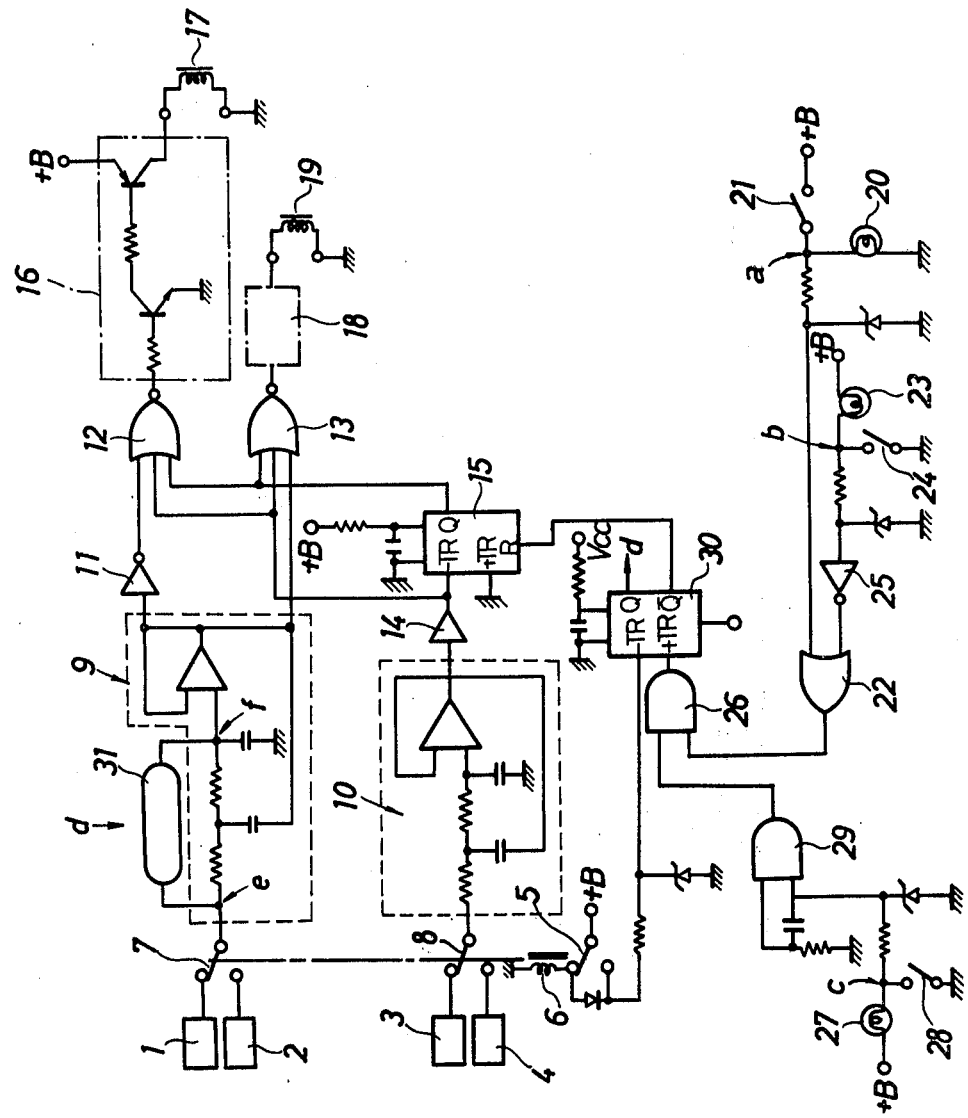

CONTROL CIRCUIT FOR VEHICLE LEVEL ADJUSTING APPARATUS

BACKGROUND OF THE INVENTION

1. Field of the Invention

The present invention relates to a control circuit for a vehicle level adjusting apparatus, and particularly to a control circuit for a vehicle level adjusting apparatus which avoids performing vehicle level adjustment in response to momentary changes in level while the vehicle is being driven.

2. Description of Relevant Art

The variation of the load on a vehicle caused by variation in the number of passengers and the weight of articles being transported results in a change in the level of the vehicle. It is highly advantageous with respect to comfortable driving for the level of the vehicle to be maintained at a constant level by adjustment thereof. From such viewpoint, there have been proposed control circuits which control the operation of vehicle level adjusting apparatus depending on the travel conditions. With regard to momentary changes in level during driving of the vehicle and essential or substantial changes therein, technical problems have arisen in controlling such vehicle level adjusting apparatus to perform a proper level adjustment in response to essential or substantial changes in level, while avoiding adjustment in response to momentary changes of the vehicle level. Therefore, provisions have been made, by using a delay circuit or the like, to prevent the level control from responding to momentary changes in level. As a result of such provisions, there has arisen a problem inasmuch as the level adjustment cannot be carried out promptly against even essential or substantial changes in the level.

The present invention effectively overcomes the aforesaid problems attendant known arrangements.

SUMMARY OF THE INVENTION

The present invention provides a control circuit for a vehicle level adjusting apparatus including a first circuit which receives at least one first signal based on a comparison between a reference vehicle level range and an actual vehicle level to make a judgment as to the necessity of an adjustment of the vehicle level and issues a second signal having a first signal status when the adjustment is judged to be necessary and a second signal status when the adjustment is judged to be unnecessary. A second circuit receives the second signal and issues a third signal based in a normal state of the second circuit on the second signal status as prolonged by a predetermined time and in a reset state of the second circuit on the second signal status as not prolonged. A third circuit receives the third signal and issues a control signal to the vehicle level adjusting apparatus. An improvement in accordance with the present invention resides in the provision of a fourth circuit which receives a fourth signal based on a halt state of the vehicle (when it is at rest) and resets the second circuit.

It is an object of the present invention to provide a control circuit for a vehicle level adjusting apparatus which does not perform the level adjustment in response to momentary changes in the level while the vehicle is being driven, whereas the circuit performs the level adjustment promptly in response to essential or substantial changes in the level when the vehicle is at rest, thereby enhancing driving comfort.

Other objects, details and advantages of the present invention will become apparent from the following detailed description of a preferred embodiment, when read in conjunction with the accompanying drawing.

BRIEF DESCRIPTION OF THE DRAWING

The single FIGURE shows a control circuit for vehicle level adjusting apparatus in accordance with the present invention.

DETAILED DESCRIPTION OF THE INVENTION

A preferred embodiment of the present invention will be described hereinbelow with reference to the accompanying single drawing FIGURE.

Sensors 1 and 2 are sensitive to changes in the vehicle level and provide signals based on the direction of change. These signals will hereinafter be referred to as direction signals. The direction signals comprise an ascent signal indicating an upward level change and a descent signal indicating a downward level change, based on a comparison with reference vehicle levels respectively provided for the sensors 1 and 2.

Sensors 3 and 4 receive an external signal so as to judge whether it is necessary or unnecessary to adjust the vehicle level and to provide signals based on the judgment. These signals will hereinafter be referred to as command signals. The command signal comprises an operation signal issued when the adjustment has been judged to be necessary and a non-operation signal issued when the adjustment has been judged to be unnecessary, based on a comparison with a reference vehicle level range provided for the sensors 3 and 4.

The sensors 1 and 3, and 2 and 4 operate as a pair of sets with the reference vehicle levels given to each set. Selection of a reference level, i.e., a change-over between the sets of sensors, is carried out by change-over switches 7 and 8 which are operated by energizing or de-energizing an associated solenoid 6 through an operator switch 5. The sensors 1, 2, 3 and 4 operate in such a manner that a variation of distance between non-spring supported and spring-supported portions of a vehicle suspension is detected, for example, in an optical manner.

The change-over switch 7 is connected to a low-pass filter 9 which eliminates high frequency components in the direction signal and provides low frequency components needed for the vehicle level adjustment. The change-over switch 8 is also connected to a similar low-pass filter 10 which eliminates high frequency components, i.e., signals having very short durations, in the command signal. The cutoff frequency of the filter 10 is set to be higher than that of the filter 9.

The filter 9 has two output terminals, one connected through an inverter 11 to a NOR gate 12 and another one connected directly to a NOR gate 13. The filter 10 has the output thereof connected through a buffer amplifier 14 to the inputs of the NOR gates 12 and 13, and also connected to the negative trigger terminal of a monostable multivibrator 15.

The monostable multivibrator 15 is triggered by a non-operation signal and provides a signal, which is derived from the input signal but given a predetermined expanded pulse width, from its output terminal Q to the inputs of the NOR gates 12 and 13.

The NOR gate 12 has the output thereof connected to an amplifier 16 including two transistors, and the output of the amplifier 16 is connected to a solenoid 17 which operates by the output current of the amplifier. The solenoid 17 serves to operate an up-pressure actuator for feeding compessed air from a compressor to a pressure chamber in the suspension unit. When the NOR gate 12 provides a high level output, the solenoid 17 is energized to operate the up-pressure actuator so that the vehicle level is adjusted within the reference level range.

The NOR gate 13 is connected at the output thereof to an amplifier 18, and then to a solenoid 19. The solenoid 19 serves to operate a down-pressure actuator. When the NOR gate 13 provides a high level output, the solenoid 19 is energized to operate the down-pressure actuator so that compressed air in the pressure chamber of the suspension unit is released and the vehicle level is adjusted to be within the reference level range.

The inputs of the NOR gates 12 and 13 are supplied as a combination of the direction signal and the command signal. One of the NOR gates 12 and 13 is selected, depending on the state of the direction signal, and a selected NOR gate provides a high output depending on the state of the command signal. If one of the NOR gates 12 and 13 receives a low level direction signal with command signals on the remaining two input terminals being low, the NOR gate provides a high level output so that the vehicle level adjustment is carried out. In this case, one of the command signals is supplied to the NOR gates 12 and 13 through the monostable multivibrator 15. Thus, once a non-operation signal, which could change into an operation signal immediately, is generated, the NOR gates 12 and 13 will receive an expanded non-operation signal. Accordingly, in instances where the vehicle level varies due to a rough road surface or braking or turning of the vehicle, the expanded non-operation signal is supplied to the NOR gates 12 and 13, thereby preventing extremely frequent and unnecessary adjustments of the level.

The arrangement in accordance with the present invention further includes a foot brake switch 21, associated with a foot brake (not shown), having the common terminal thereof connected to a stop lamp 20 and to one input of an OR gate 22; and a parking brake switch 24, associated with a parking brake (not shown), having the common terminal thereof connected to a parking brake lamp 23 and to another input of the OR gate 22 through an inverter 25. The OR gate 22 has the output thereof connected to one input of an AND gate 26. In addition, there is provided a door switch 28, associated with a door (not shown), having the common terminal thereof connected to a door lamp 27 and to the input of an AND gate 29. The output of the AND gate 29 is connected to another input of the AND gate 26.

The output of the AND gate 26 is connected to the positive trigger terminal of a monostable multivibrator 30. The negative trigger terminal of the monostable multivibrator 30 is connected to the operator switch 5, and the output Q of the multivibrator 30 is connected to an analog switching device 31 within the filter 9 (via an imaginary line d—d). The output $\overline{Q}$ of multivibrator 30 is connected to the reset terminal R of the monostable multivibrator 15.

The operation of the monostable multivibrator 30 invalidates the expansion of the non-operation signal produced by the monostable multivibrator 15 based on the conductive or non-conductive state of foot brake switch 21 and the parking brake switch 24 which relate to the halt or rest state of the vehicle and also on the conductive or non-conductive state of the door switch 28 which relates to the entering or exiting of a pasenger into and from the vehicle. There is thus provided an expanded non-operation signal conditional upon whether the passenger has seated himself within the vehicle or left the vehicle and at the same time the vehicle is halted or at rest.

Accordingly, when the foot brake or the parking brake is used for stopping the vehicle, causing the foot brake switch 21 of the parking brake switch 24 to become conductive, the OR gate 22 receives a high level signal at either one of the inputs thereof. Also, when the door is closed after the entrance or exiting of the passenger has been completed, the door switch 28 becomes non-conductive, causing the inputs of the AND gate 29 to become high momentarily. Thus, the AND gate 29 provides a high level output while the vehicle is in the halt or rest state and the entrance or exiting of the passenger is completed. This output signal is delivered to the positive trigger input of the monostable multivibrator 30, which provides at the output $\overline{Q}$ thereof a signal which invalidates the expansion of the non-operation signal provided by the monostable multivibrator 15.

In the foregoing manner, the vehicle level can be adjusted promptly in response to essential or substantial changes of the level caused by passengers entering or leaving the vehicle or by loading or unloading articles on or from the vehicle, thereby providing practical utility as well as driving comfort.

The circuit arrangement comprising the operator switch 5, the monostable multivibrator 30, the analog switching device 31 connected with the multivibrator 30 through the imaginary line d—d, and the monostable multivibrator 15 functions to temporarily invalidate the expansion of the non-operation signal provided by the monostable multivibrator 15 when the vehicle level is changed by means of the switches 7 and 8 associated with the operator switch 5, and also to temporarily invalidate the filtering action by short-circuiting point e to point f. The vehicle level can thus be adjusted continuously and promptly, thereby enhancing driving comfort.

Although there has been described what is at present considered to the preferred embodiment of the invention, it will be understood that the invention may be embodied in other specific forms without departing from the spirit or essential characteristics thereof. The present embodiment is therefore to be considered in all respects as illustrative, and not restrictive. The scope of the invention is indicated by the appended claims rather than by the foregoing description.

We claim:

1. In a control circuit for a vehicle level adjusting apparatus including:
   a first circuit which receives at least one first signal based on a comparison between a reference vehicle level range and an actual vehicle level to make a judgment as to the necessity of an adjustment of the vehicle level and issues a second signal, said second signal having a first signal status when said adjustment is judged to be necessary and a second signal status when said adjustment is judged to be unnecessary;
   a second circuit comprising a monostable multivibrator which receives said second signal and issues a third signal based on said second signal status of said second signal, as prolonged by a predetermined time in a normal state of said second circuit and as not prolonged in a reset state of said second circuit;

a third circuit which receives said third signal and issues a control signal to said vehicle level adjusting apparatus;

an improvement comprising: a fourth circuit, connected to a reset terminal of said second circuit, which receives a fourth signal based on a halt state of said vehicle and a fifth signal based on an operation of a door of said vehicle, and resets said second circuit.

2. A control circuit in accordance with claim 1, wherein:

said fourth signal comprises a sixth signal based on an operation of a foot brake of said vehicle, and a seventh signal based on an operation of a parking brake of said vehicle.

3. A control circuit in accordance with claim 2, wherein:

said fourth circuit comprises an OR gate having the inputs thereof connected so as to receive said sixth signal and said seventh signal and an AND gate having the inputs thereof connected so as to receive an output of said OR gate and said fifth signal; and an output of said AND gate is used to reset said second circuit.

4. A control circuit in accordance with claim 3, wherein:

said sixth signal has a relatively high level as said foot brake is operated, said seventh signal has a relatively high level as said parking brake is operated, and said fifth signal has a relatively high level as said door is closed, said second circuit being reset when said AND gate provides a high level output.

* * * * *